United States Patent
Ohta et al.

(10) Patent No.: US 10,600,262 B2
(45) Date of Patent: Mar. 24, 2020

(54) DISPLAY DEVICE FOR ELECTRIC VEHICLE

(71) Applicant: Mitsubishi Jidosha Kogyo Kabushiki Kaisha, Tokyo (JP)

(72) Inventors: Jinichi Ohta, Tokyo (JP); Toshifumi Mizui, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 204 days.

(21) Appl. No.: 15/711,219

(22) Filed: Sep. 21, 2017

(65) Prior Publication Data

US 2018/0102002 A1    Apr. 12, 2018

(30) Foreign Application Priority Data

Oct. 6, 2016  (JP) ................................ 2016-197769

(51) Int. Cl.
*G07C 5/08* (2006.01)
*B60L 11/18* (2006.01)
(Continued)

(52) U.S. Cl.
CPC ............ *G07C 5/0825* (2013.01); *B60K 35/00* (2013.01); *B60L 3/12* (2013.01); *B60L 15/20* (2013.01);
(Continued)

(58) Field of Classification Search
CPC .. G07C 5/08; G01C 21/34; B60L 8/00; B60L 11/18; G06F 19/00; B60Q 1/00
See application file for complete search history.

(56) References Cited

U.S. PATENT DOCUMENTS

| 2012/0116606 A1 | 5/2012 | Ichinokawa |
| 2012/0179311 A1* | 7/2012 | Skaff ................... G07C 5/004 701/22 |

(Continued)

FOREIGN PATENT DOCUMENTS

| CN | 104417385 A | 3/2015 |
| JP | 5461365 B2 | 4/2014 |

OTHER PUBLICATIONS

Brad Berman: "Driving an Electric Car for Maximum Efficiency," Nov. 6, 2014.
Extended European Search Report effective Feb. 23, 2018, issued to the corresponding EP Application No. 17190440.2.
Communication pursuant to Article 94(3) dated Oct. 19, 2018 issued to the corresponding EP Application No. 17190440.2.
Office Action dated Sep. 2, 2019, issued to the corresponding CN Application No. 201710845703.8, with an English translation.

*Primary Examiner* — Yuri Kan
(74) *Attorney, Agent, or Firm* — Birch, Stewart, Kolasch & Birch, LLP

(57) ABSTRACT

A display device for an electric vehicle includes a calculation unit which calculates a power consumption rate of the electric vehicle, and a display unit which displays the power consumption rate calculated by the calculation unit, and a possible travel range achievable at the power consumption rate. The display unit includes a power consumption rate scale indicating scales of the power consumption rate, a possible travel range scale indicating scales of the possible travel range and disposed corresponding to the power consumption rate scale, and a line portion displayed between the power consumption rate scale and the possible travel range scale. An end portion of the line portion closer to the power consumption rate scale indicates the power consumption rate, and an end portion of the line portion closer to the possible travel range scale indicates the possible travel range.

20 Claims, 6 Drawing Sheets

(51) Int. Cl.
  *G01C 21/34*   (2006.01)
  *B60L 15/20*   (2006.01)
  *G01L 7/02*    (2006.01)
  *B60L 58/13*   (2019.01)
  *B60K 35/00*   (2006.01)
  *B60L 3/12*    (2006.01)

(52) U.S. Cl.
  CPC ............... *B60L 58/13* (2019.02); *G01L 7/02* (2013.01); *B60K 2370/168* (2019.05); *B60K 2370/169* (2019.05); *B60K 2370/174* (2019.05); *B60L 2250/16* (2013.01); *B60L 2260/52* (2013.01); *B60L 2260/54* (2013.01); *Y02T 10/645* (2013.01); *Y02T 10/72* (2013.01); *Y02T 10/7275* (2013.01)

(56) References Cited

U.S. PATENT DOCUMENTS

| | | | | |
|---|---|---|---|---|
| 2012/0179318 A1* | 7/2012 | Gilman | ............. | B60W 50/0097 701/22 |
| 2014/0236467 A1* | 8/2014 | Liu | ................. | B60L 11/1862 701/123 |
| 2014/0358342 A1* | 12/2014 | Marks | ................. | B60L 8/003 701/22 |
| 2014/0372019 A1* | 12/2014 | Skaff | ................. | B60K 35/00 701/123 |
| 2015/0057916 A1 | 2/2015 | Ishii et al. | | |
| 2016/0363456 A1* | 12/2016 | Pujos | ................. | G01S 19/42 |

\* cited by examiner

DISPLAY DEVICE FOR ELECTRIC VEHICLE

TECHNICAL FIELD

This disclosure relates to a display device for an electric vehicle that displays a possible travel range and the like.

BACKGROUND

Electric vehicles, such as electric cars for example, are provided with a driving range display device which displays a possible travel range achievable with a current remaining amount of a traction battery. For example, a driving range display apparatus in Patent Document 1 (Japanese Patent No. 5461365) displays a current driving range D from full charge and a possible travel range Di in such a manner as to be comparable with a previous total driving range (see FIG. 4 and the like).

SUMMARY

Sales catalogs of electric cars introduce a catalog power consumption rate, which is a rate of power consumption (hereinafter, referred to as power consumption rate) indicating a travel distance (km) per unit energy amount (1 kWh). The catalog power consumption rate merely represents a power consumption rate obtained in a test drive of the electric car in a certain driving mode. However, the actual driving of the electric car by a driver involves a power consumption rate (hereinafter, referred to as an actual power consumption rate) may be affected by a driving operation by the driver (for example, operations for acceleration and air conditioner) to be lower than the catalog power consumption rate, resulting in a possible travel range smaller than expected. When information indicating the association between the possible travel range and the actual power consumption rate can be displayed to the driver, the driver can be guided to perform a driving operation (what is known as ecological driving) involving an actual power consumption rate close to the catalog power consumption rate.

In view of the foregoing, an object of at least one embodiment of the present invention is to provide a display device for an electric vehicle that can perform displaying with which an association between the possible travel range and the power consumption rate can be recognized.

A display device for the electric vehicle according to at least one embodiment of the present invention includes: a calculation unit which calculates a power consumption rate of the electric vehicle on the basis of a travel distance of the electric vehicle and power consumption of a traction battery of the electric vehicle relative to the travel distance; and a display unit which displays the power consumption rate calculated by the calculation unit, and a possible travel range achievable at the power consumption rate with a remaining amount of the traction battery. The display unit includes: a power consumption rate scale indicating scales of the power consumption rate; a possible travel range scale indicating scales of the possible travel range and disposed corresponding to the power consumption rate scale; and a line portion displayed between the power consumption rate scale and the possible travel range scale. The line portion has two end portions including an end portion that is closer to the power consumption rate scale and indicates the power consumption rate, and an end portion that is closer to the possible travel range scale and indicates the possible travel range.

With the above-described configuration, the driver can be provided with a display with which an association between the possible travel range and the power consumption rate can be recognized. Thus, the driver can be guided towards ecological driving involving a power consumption rate close to a target value, whereby the possible travel range can be prevented from decreasing.

DETAILED DESCRIPTION

A display device of an electric vehicle according to some embodiments of the present invention is described below with reference to FIG. 1 to FIG. 6. Examples of the electric vehicle include: an electric vehicle having a traction motor provided to one of front wheels and rear wheels as described herein; an electric vehicle having a traction motor provided to each of the front wheels and the rear wheels; and a hybrid vehicle (including a plug-in hybrid vehicle) having a traction motor provided to at least one of front wheels and rear wheels and also having an engine. When the electric vehicle is the hybrid vehicle, the present embodiment may be employed when the vehicle is driving under an Electric Vehicle (EV) driving mode using a traction battery and the traction motor.

Embodiment 1

Figure 1:
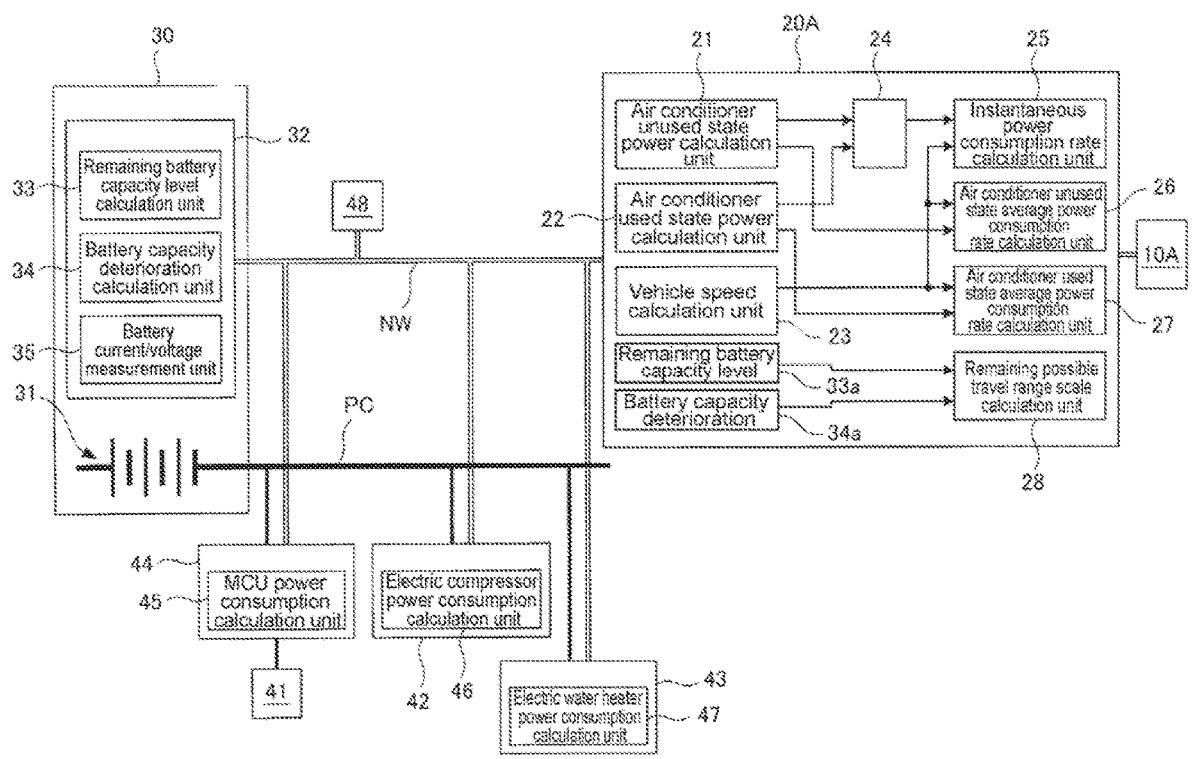
FIG. 1 is a block diagram of an electric vehicle according to one example (Embodiment 1) of the present invention.
Figure 2:
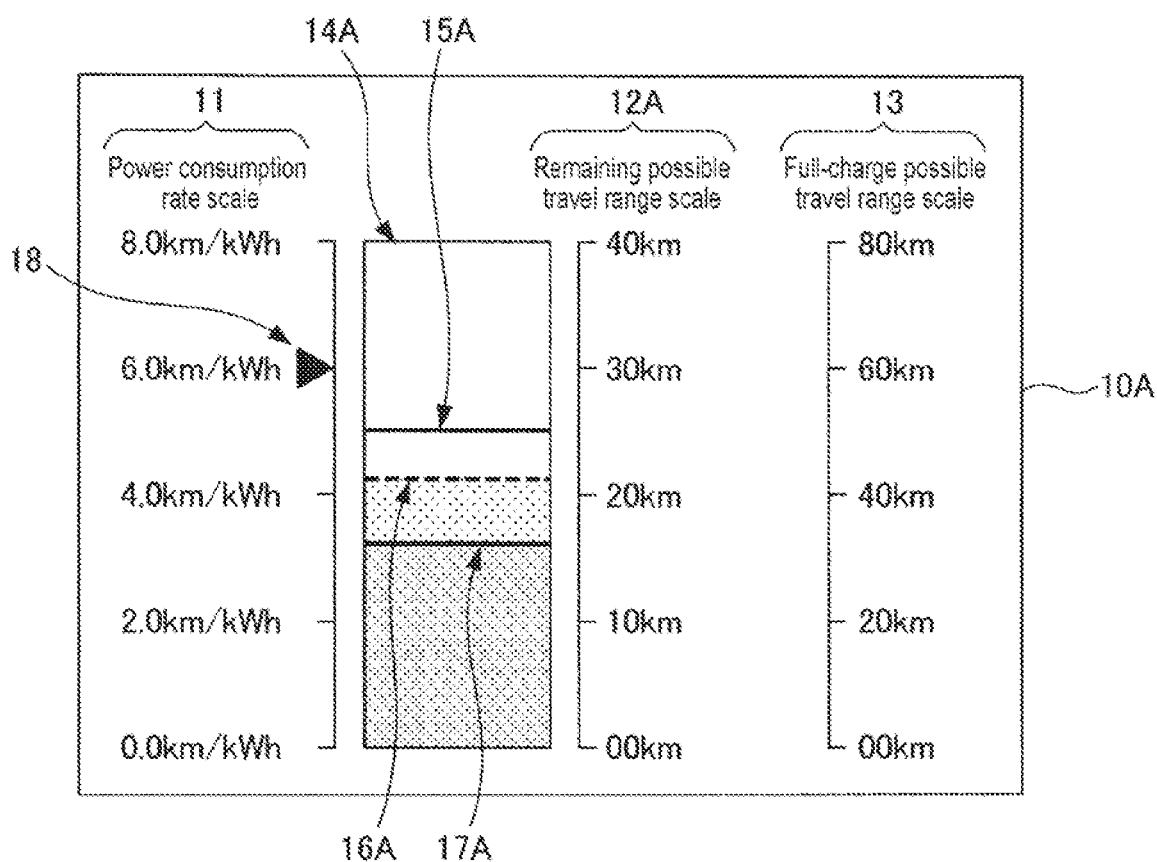
FIG. 2 is a diagram illustrating a display example in a display unit of a display device in the electric vehicle illustrated in FIG. 1, is a state where an air conditioner is used.
Figure 3:
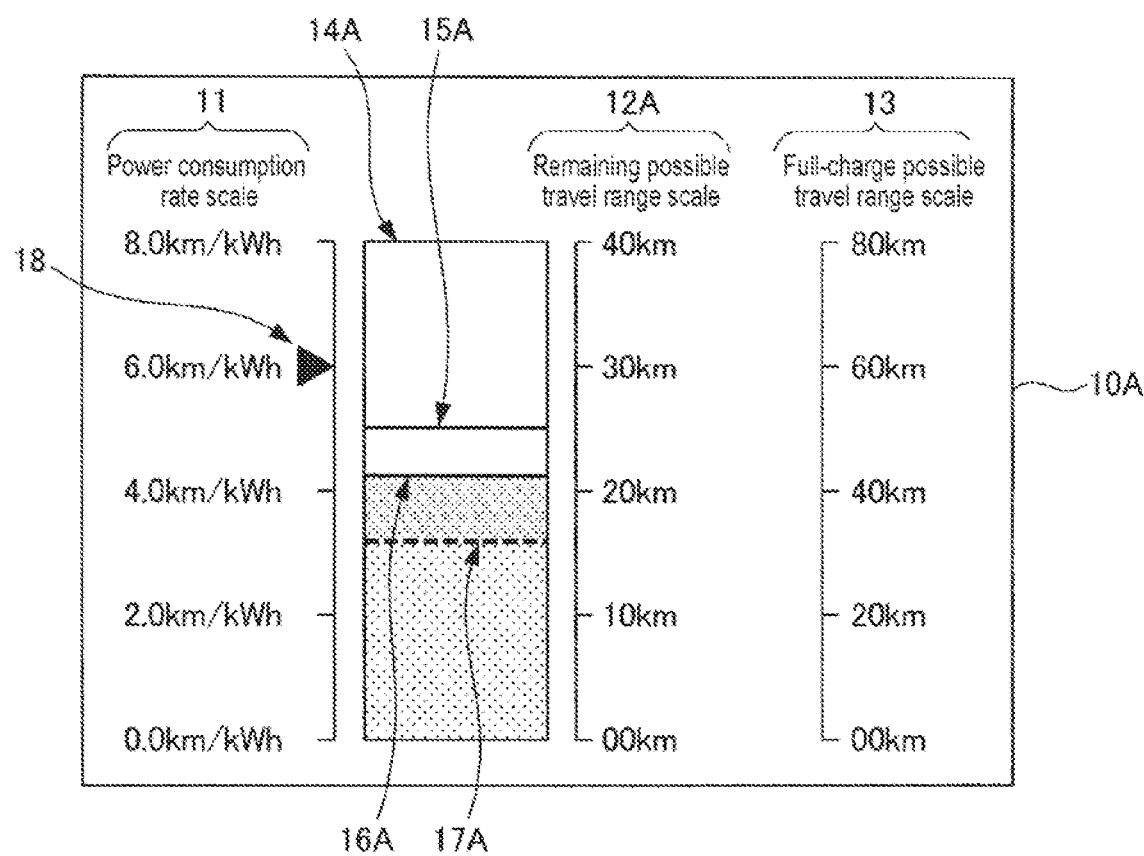
FIG. 3 is a diagram illustrating a display example in the display unit of the display device in the electric vehicle illustrated in FIG. 1, is a state where the air conditioner is unused.

FIG. 1 is a block diagram illustrating a display device for an electric vehicle according to the present embodiment. FIG. 2 and FIG. 3 are each a diagram illustrating a display example in a display unit of the display device for the electric vehicle illustrated in FIG. 1. FIG. 2 illustrates a display example corresponding to a state where an air conditioner is used. FIG. 3 illustrates a display example corresponding to a state where the air conditioner is unused.

An electric car (hereinafter, referred to as a vehicle), illustrated in FIG. 1, is provided with the display device for the electric vehicle according to the present embodiment, and includes: a display unit 10A; a calculation unit 20A; a battery pack 30 including a traction battery 31; a traction motor 41 which receives power supply from the traction battery 31 through a power cable PC; an electric compressor 42; an electric water heater 43; an accessory battery (not illustrated) which supplies power to accessories of the vehicle; a speed meter 48; and the like.

The display unit 10A may be provided as an independent display device (such as a liquid crystal panel for example) on an instrument panel, or may be provided by a navigation system as a display screen. The calculation unit 20A may be implemented with an independent calculation device with a dedicated electronics control unit (ECU) additionally provided, or may be implemented with a program added to a built-in ECU.

In this example, electrical equipment, other than the traction motor 41 or the accessory battery, which receives power supply from the traction battery 31 includes an air conditioner including the electric compressor 42 and the electric water heater 43. Power consumption and power consumption rate, described later, are calculated on the basis of whether the air conditioner including these components is used or unused. Alternatively, the calculation may be based on whether any one of the electric compressor 42 and the electric water heater 43 is used or unused. When the vehicle further includes electrical equipment that receives power supply from the traction battery 31, the calculation for the power consumption and the power consumption rate, described later, may be further based on whether the other electrical equipment is used or unused. Examples of such additional electrical equipment include a seat heater and a headlamp.

The display on the display unit 10A, based on the calculation by the calculation unit 20A described later, includes: a power consumption rate scale 11; a remaining possible travel range scale 12A; a full-charge possible travel range scale 13; and a display area 14A as illustrated in FIG. 2 and FIG. 3. An instantaneous value line 15A, an air conditioner unused state average value line 16A (hereinafter, "average value line 16A"), and an air conditioner used state average value line 17A (hereinafter, "average value line 17A"), as line portions, are displayed in the display area 14A. A catalog power consumption rate mark 18 is displayed in the power consumption rate scale 11. The display area 14A is a rectangle area between the power consumption rate scale 11 and the remaining possible travel range scale 12A.

When the air conditioner is unused (hereinafter, referred to as an air conditioner unused condition), the "air conditioner unused state" indicates this state, whereas when the air conditioner is used (hereinafter, referred to as an air conditioner used condition), the "air conditioner unused state" indicates a state that assumes a case where the air conditioner is unused. In addition, when the air conditioner is used, the "air conditioner used state" indicates this state, whereas when the air conditioner is unused, the "air conditioner used state" indicates a state that assumes a case where the air conditioner is used.

The power consumption rate scale 11 has vertical scales of power consumption rate for the instantaneous value line 15A, the average value line 16A, and the average value line 17A, in the unit of "km/kWh". In this example, fixed scale values incremented in a unit of 2.0 km/kWh with the maximum value being 8.0 km/kWh are employed. The scale values may be appropriately set differently among vehicle models, vehicles, and the like.

The remaining possible travel range scale 12A also has vertical scales of the possible travel range for the instantaneous value line 15A, the average value line 16A, and the average value line 17A, in a unit of "km". As will be described in detail later, the instantaneous value line 15A, the average value line 16A, and the average value line 17A each indicate the power consumption rate and the possible travel range.

In the figure, the instantaneous value line 15A, the average value line 16A, and the average value line 17A are each a straight line (horizontal line) extending in a horizontal direction. Thus, the scale value of the remaining possible travel range scale 12A is a variable value that changes as appropriate on the basis of a remaining battery capacity level 33a and a battery capacity deterioration 34a (remaining amount) of the traction battery 31. In this example, the scale value is incremented in a unit of 10 km with the maximum value being 40 km. The scale values are the same as those of the full-charge possible travel range scale 13 when the traction battery 31 is fully charged and there is no battery capacity deterioration, that is, when the traction battery 31 has the remaining amount equal to the initial battery capacity.

In FIG. 2 and FIG. 3, the power consumption rate scale 11 and the remaining possible travel range scale 12A, having the vertical scales, are associated with each other and are arranged side by side in the horizontal direction while extending in parallel with each other, on both sides (left and right sides in the figure) of the instantaneous value line 15A, the average value line 16A, and the average value line 17A displayed as horizontal lines. The power consumption rate scale 11 and the remaining possible travel range scale 12A may have horizontal scales, may be associated with each other, and may be arranged side by side in the vertical direction (upper and lower sides in the figure) while extending in parallel with each other. In such a configuration, the instantaneous value line 15A, the average value line 16A, and the average value line 17A may each be provided between the scales, as a vertical line shifting in a lateral direction. Simply put, the display mode illustrated in FIG. 2 and FIG. 3 may be changed by being rotated by 90°. The power consumption rate scale 11 and the remaining possible travel range scale 12A may be modified to have circular or arc shaped scales. The power consumption rate scale 11 and the remaining possible travel range scale 12A having the circular or arc shaped scales may be concentrically arranged and may be associated with each other with the one of the scales provided more on the inner side than the other. In such a configuration, the instantaneous value line 15A, the average value line 16A, and the average value line 17A may each be displayed as a line (a straight line or a curved line) shifting in a circumference direction of the scales having the circular or arc shape.

The full-charge possible travel range scale 13 is displayed side by side with the remaining possible travel range scale 12A, and has a vertical scale indicating a possible travel range in the unit of "km" as in the case of the scale described above. In this example, the scale has fixed values incremented in a unit of 20 km, with the maximum value being 80 km. The scale values may be appropriately set to be different among vehicle models, vehicles, and the like. The full-charge possible travel range scale 13 may be omitted from the display.

The instantaneous value line 15A, which is a horizontal line, has an end portion that is closer to the power consumption rate scale 11 and indicates instantaneous power consumption rate (first power consumption rate) calculated by an instantaneous power consumption rate calculation unit 25 described later, and has an end portion that is closer to the remaining possible travel range scale 12A and indicates the possible travel range (first possible travel range) achievable at the instantaneous power consumption rate. The instantaneous value line 15A has a displayed position in the display area 14A shifting in the vertical direction based on the instantaneous power consumption rate calculated.

The average value line 16A, which is a horizontal line, has an end portion that is closer to the power consumption rate scale 11 and indicates average power consumption rate (second power consumption rate) in the air conditioner unused state calculated by an air conditioner unused state average power consumption rate calculation unit 26 described later, and has an end portion that is closer to the remaining possible travel range scale 12A and indicates the possible travel range (second possible travel range) achievable at the average power consumption rate in the air conditioner unused state. The average value line 16A has a displayed position in the display area 14A shifting in the vertical direction based on the average power consumption rate in the air conditioner unused state calculated. The average value line 16A is displayed as a part of a displayed bar graph.

The average value line 17A, as a horizontal line, has an end portion that is closer to the power consumption rate scale 11 and indicates average power consumption rate (third power consumption rate) in the air conditioner used state calculated by an air conditioner used state average power consumption rate calculation unit 27 described later, and has an end portion that is closer to the remaining possible travel range scale 12A and indicates the possible travel range (third possible travel range) achievable at the average power consumption rate in the air conditioner used state. The average value line 17A has a displayed position in the display area 14A shifting in the vertical direction based on the average power consumption rate in the air conditioner used state calculated. The average value line 17A is displayed as a part of the displayed bar graph.

Even in the air conditioner used condition where the air conditioner is used, the average power consumption rate in the air conditioner unused state is calculated, and the air conditioner unused state average value line 16A is displayed together with the air conditioner used state average value line 17A and the instantaneous value line 15A as illustrated in FIG. 2. Even in the air conditioner unused condition where the air conditioner is unused, the average power consumption rate in the air conditioner used state is calculated (estimated value calculation), and the air conditioner used state average value line 17A is displayed together with the air conditioner unused state average value line 16A and the instantaneous value line 15A as illustrated in FIG. 3.

In the air conditioner used condition, the air conditioner used state average value line 17A and the air conditioner unused state average value line 16A are displayed visually differently, with the former being more noticeable than the latter. For example, the two lines are different types of lines, or have different colors or densities. An area from the origin to the air conditioner used state average value line 17A and an area from the air conditioner used state average value line 17A to the air conditioner unused state average value line 16A are displayed visually differently, with the former being more noticeable than the latter. For example, the two areas have different colors, densities, or lighting states (see FIG. 2).

Also in the air conditioner unused condition, the air conditioner unused state average value line 16A and the air conditioner used state average value line 17A are displayed visually differently, with the former being more noticeable than the latter. For example, the two lines are different types of lines, or have different colors or densities. The area from the air conditioner used state average value line 17A to the air conditioner unused state average value line 16A and the area from the origin to the air conditioner used state average value line 17A are displayed visually differently, with the former being more noticeable than the latter. For example, the two areas have different colors, densities, or lighting states (see FIG. 3).

For example, also in the air conditioner used condition, the air conditioner unused state average value line 16A and the air conditioner used state average value line 17A may be displayed visually differently, with the former being more noticeable than the latter. With such a display mode, the driver can more easily notice the air conditioner unused state average value line 16A, and thus can be guided towards the ecological driving.

As alternative display examples, two lines (the average value line 16A and the average value line 17A) may be displayed with: one of the two lines displayed to be more noticeable being a solid line whereas the other one being a dotted line; the one displayed to be more noticeable having a more noticeable color whereas the other one having a different and less noticeable color; and the one displayed to be more noticeable in a color having a high density whereas the other one in a color having a low density. Two areas (the area from the origin to the average value line 17A and the area from the average value line 17A to the average value line 16A) may be displayed with: one of the areas displayed to be more noticeable having a more noticeable color whereas the other one having a different and less noticeable color; the one displayed to be more noticeable in a color having a high density whereas the other one in a color having a low density; and the one displayed to be more noticeable being in a lighting state, whereas the other one being in a blinking state.

The instantaneous value line 15A may be displayed visually differently from the average value line 16A and the average value line 17A. For example, the instantaneous value line 15A may be a different type of line, or have a different color or density compared with the average value line 16A and the average value line 17A.

The catalog power consumption rate mark 18 indicates a catalog power consumption rate (target value) of the vehicle, and is displayed for the comparison with the instantaneous value line 15A, the average value line 16A, and the average value line 17A. In this example, the catalog power consumption rate is indicated with a triangular mark in the power consumption rate scale 11. The mark may also be displayed in the display area 14A. The mark may have other shapes, examples of which include an arrow shape and a line. The present invention is not limited to this example where the catalog power consumption rate is displayed, and any index for the driver, such as information on the ecological driving, may be displayed.

In the display unit 10A illustrated in FIG. 2 and FIG. 3, the instantaneous value line 15A, the average value line 16A, and the average value line 17A, as horizontal lines, each indicate a power consumption rate and a possible travel range. Thus, the driver can be view a display with which the association between the power consumption rate and the possible travel range can be recognized. The catalog power consumption rate indicated by the catalog power consumption rate mark 18 is displayed to the driver together with the power consumption rate and the possible travel range indicated by the instantaneous value line 15A, the average value line 16A, and the average value line 17A. Thus, the driver can be guided towards the ecological driving involving a power consumption rate close to the catalog power consumption rate, whereby the possible travel range can be prevented from decreasing.

The display on the display unit 10A illustrated in FIG. 2 and FIG. 3 is based on the calculation by the calculation unit 20A. First of all, configurations of the battery pack 30, the traction motor 41, the electric compressor 42, the electric water heater 43, and the speed meter 48 are described, as the basis for describing the configuration and the calculation of the calculation unit 20A, with reference to FIG. 1.

The battery pack 30 includes: the traction battery 31; and a battery management unit (BMU) 32 that measures various statuses of the traction battery 31 and performs calculation for controlling the traction battery 31. The BMU 32 is provided with a remaining battery capacity level calculation unit 33, a battery capacity deterioration calculation unit 34, a battery current/voltage measurement unit 35, and the like. The remaining battery capacity level calculation unit 33 calculates the remaining battery capacity level (SOC: State of Charge) 33a of the traction battery 31. The battery capacity deterioration calculation unit 34 calculates the battery capacity deterioration (SOH: State of Health) 34a of the traction battery 31. The battery current/voltage measurement unit 35 measures current and voltage of the traction battery 31. The remaining battery capacity level calculation unit 33 and the battery capacity deterioration calculation unit 34 employ known methods to respectively calculate the remaining battery capacity level 33a and the battery capacity deterioration 34a.

A motor control unit (MCU) 44 controls power supply from the traction battery 31 to the traction motor 41 through the power cable PC. An MCU power consumption calculation unit 45, provided to the MCU 44, calculates the power consumption of the traction motor 41. Similarly, an electric compressor power consumption calculation unit 46, provided to the electric compressor 42, calculates the power consumption of the electric compressor 42. Similarly, an electric water heater power consumption calculation unit 47, provided to the electric water heater 43, calculates the power consumption of the electric water heater 43. The power consumption of the accessory battery is calculated by a similar configuration.

For example, the speed meter 48, which is a meter displaying vehicle speed, calculates the rotation speed of the wheels based the rotation speed of the traction motor 41 calculated by the MCU 44 to calculate the vehicle speed, and displays the vehicle speed calculated.

The display unit 10A, the calculation unit 20A, the BMU 32, the electric compressor 42, the electric water heater 43, the MCU 44, the accessory battery, and the speed meter 48 are connected to each other in such a manner as to be capable of communicating with each other to exchange information, through a network NW examples of which include a controller area network (CAN). The calculation unit 20A receives information from the BMU 32, the electric compressor 42, the electric water heater 43, the MCU 44, the accessory battery, and the speed meter 48, and calculates the power consumption rate or the like based on the information. The result of the calculation is displayed on the display unit 10A.

The calculation unit 20A includes an air conditioner unused state power calculation unit 21, an air conditioner used state power calculation unit 22, a vehicle speed calculation unit 23, a selection unit 24, the instantaneous power consumption rate calculation unit 25, the air conditioner unused state average power consumption rate calculation unit 26, the air conditioner used state average power consumption rate calculation unit 27, and a remaining possible travel range scale calculation unit 28.

The air conditioner unused state power calculation unit 21 calculates the power consumption of the traction battery 31 in the air conditioner unused state. Specifically, in the air conditioner unused condition where the air conditioner is unused, the air conditioner unused state power calculation unit 21 calculates the power consumption in the air conditioner unused state based on the battery current and the battery voltage measured by the battery current/voltage measurement unit 35, or calculates the power consumption of the traction motor 41 and the power consumption of the accessory battery calculated by the MCU power consumption calculation unit 45, as the power consumption in the air conditioner unused state.

In the air conditioner used condition where the air conditioner is used, the air conditioner unused state power calculation unit 21 calculates the power consumption in the air conditioner unused state by subtracting the power consumption calculated based on the battery current and the battery voltage of the traction battery 31 measured by the battery current/voltage measurement unit 35, by the power consumption of the electric compressor 42 calculated by the electric compressor power consumption calculation unit 46 and the power consumption of the electric water heater 43 calculated by the electric water heater power consumption calculation unit 47. Alternatively, the air conditioner unused state power calculation unit 21 calculates the power consumption in the air conditioner unused state as the power consumption of the traction motor 41 and the power consumption of the accessory battery calculated by the MCU power consumption calculation unit 45.

Thus, the air conditioner unused state power calculation unit 21 calculates the power consumption of the traction motor 41 and the accessory battery as the power consumption in the air conditioner unused state. The power consumption in the air conditioner unused state calculated by the air conditioner unused state power calculation unit 21 is input to the selection unit 24 and the air conditioner unused state average power consumption rate calculation unit 26. When the air conditioner unused state power calculation unit 21 is in a hybrid vehicle, the calculation is performed if the vehicle is in an EV driving mode.

The air conditioner used state power calculation unit 22 calculates the power consumption of the traction battery 31 in the air conditioner used state. Specifically, in the air conditioner used condition where the air conditioner is used, the air conditioner used state power calculation unit 22 calculates the power consumption in the air conditioner used state based on the battery current and the battery voltage of the traction battery 31 measured by the battery current/voltage measurement unit 35, or as a sum of the power consumption of the traction motor 41 and the power consumption of the accessory battery calculated by the MCU power consumption calculation unit 45, the power consumption of the electric compressor 42 calculated by the electric compressor power consumption calculation unit 46, and the power consumption of the electric water heater 43 calculated by the electric water heater power consumption calculation unit 47.

In the air conditioner unused condition where the air conditioner is unused, the electric compressor 42 and the electric water heater 43 are not operating and thus the power consumption calculated by the electric compressor power consumption calculation unit 46 and the electric water heater power consumption calculation unit 47 is substantially 0. Thus, the air conditioner used state power calculation unit 22 cannot directly calculate the power consumption in the air conditioner used state. In view of this, estimation values of the power consumption estimated to be consumed when the electric compressor 42 and the electric water heater 43 are operating are respectively calculated by the electric compressor power consumption calculation unit 46 and the electric water heater power consumption calculation unit 47 in advance. The calculation is performed based on these estimation values.

For example, the estimation value described above may be obtained as the power consumption estimated from the current temperature inside and outside the vehicle, based on pre-set map data (map data indicating the relationship between the temperature inside and outside the vehicle and the power consumption).

Thus, in the state where the air conditioner is unused, the air conditioner used state power calculation unit 22 may calculate the power consumption in the air conditioner used state by adding the estimated values of the power consumption estimated by the electric compressor power consumption calculation unit 46 and the electric water heater power consumption calculation unit 47 to the power consumption calculated based on the battery current and the battery voltage of the traction battery 31 measured by the battery current/voltage measurement unit 35 or to the power consumption of the traction motor 41 and the power consumption of the accessory battery calculated by the MCU power consumption calculation unit 45.

Thus, the air conditioner used state power calculation unit 22 calculates the power consumption in the air conditioner used state as the actual power consumption or the estimated power consumption of the traction motor 41, the accessory battery, the electric compressor 42, and the electric water heater 43. The power consumption in the air conditioner used state calculated by the air conditioner used state power calculation unit 22 is input to the selection unit 24 and the air conditioner used state average power consumption rate calculation unit 27. When the air conditioner used state power calculation unit 22 is in a hybrid vehicle, this calculation is also performed while the vehicle is in the EV driving mode.

The vehicle speed calculation unit 23 acquires the vehicle speed displayed on the speed meter 48 or calculates the vehicle speed based on the rotation speed of the traction motor 41 measured by the MCU 44. The vehicle speed thus acquired or calculated is input to the instantaneous power consumption rate calculation unit 25, the air conditioner unused state average power consumption rate calculation unit 26, and the air conditioner used state average power consumption rate calculation unit 27.

The selection unit 24 selects one of the power consumption in the air conditioner unused state received from the air conditioner unused state power calculation unit 21 and the power consumption in the air conditioner used state received from the air conditioner used state power calculation unit 22. More specifically, the former is selected when the air conditioner is currently unused and the latter is selected when the air conditioner is currently used. The selected power consumption is input to the instantaneous power consumption rate calculation unit 25.

The instantaneous power consumption rate calculation unit 25 calculates the instantaneous power consumption rate based on the vehicle speed received from the vehicle speed calculation unit 23 and the power consumption received from the selection unit 24. Specifically, the instantaneous travel distance at the current moment (a predetermined period of time which is several to several hundreds of milliseconds) is calculated based on the vehicle speed received from the vehicle speed calculation unit 23, the instantaneous power consumption at the moment (instantaneous travel distance) is calculated based on the power consumption received from the selection unit 24, and the instantaneous power consumption rate is obtained by dividing the instantaneous travel distance thus calculated by the instantaneous power consumption thus calculated. The instantaneous power consumption rate thus obtained is input to the display unit 10A, to be displayed as the instantaneous value line 15A illustrated in FIG. 2 and FIG. 3.

The air conditioner unused state average power consumption rate calculation unit 26 calculates the average power consumption rate in the air conditioner unused state based on the vehicle speed received from the vehicle speed calculation unit 23 and the power consumption in the air conditioner unused state received from the air conditioner unused state power calculation unit 21. Specifically, a travelling time corresponding to the predetermined travel distance (predetermined distance of several to several tens of kilometers) set in advance is calculated based on the vehicle speed received from the vehicle speed calculation unit 23. Then, the power consumption in the air conditioner unused state, received from the air conditioner unused state power calculation unit 21, is integrated within the calculated travelling time (predetermined travel distance). The predetermined travel distance is divided by the integrated power consumption, whereby the average power consumption rate in the air conditioner unused state is obtained. In other words, the power consumption rate in the air conditioner unused state is calculated for a plurality of times, while the vehicle travels for the predetermined travel distance, and then the power consumption rates calculated for a plurality of times are averaged, whereby the average power consumption rate is obtained. The average power consumption rate thus obtained is input to the display unit 10A, and is displayed as the average value line 16A illustrated in FIG. 2 and FIG. 3. The "predetermined travel distance" is longer than the instantaneous travel distance described above.

The air conditioner used state average power consumption rate calculation unit 27 calculates the average power consumption rate in the air conditioner used state, based on the vehicle speed received from the vehicle speed calculation unit 23 and the power consumption in the air conditioner used state received from the air conditioner used state power calculation unit 22. Specifically, the travelling time corresponding to the predetermined travel distance described above is calculated based on the vehicle speed received from the vehicle speed calculation unit 23. Then, the power consumption in the air conditioner used state, received from the air conditioner used state power calculation unit 22, is integrated within the calculated travelling time (predetermined travel distance). The predetermined travel distance is divided by the integrated power consumption, whereby the average power consumption rate in the air conditioner used state is obtained. In other words, the power consumption rate in the air conditioner used state is calculated for a plurality of times, while the vehicle travels for the predetermined travel distance, and then the power consumption rates calculated for a plurality of times are averaged, whereby the average power consumption rate is obtained. The average power consumption rate thus obtained is input to the display unit 10A, and is displayed as the average value line 17A illustrated in FIG. 2 and FIG. 3.

The displayed position of the instantaneous value line 15A described above is shifted (vertically) in accordance with various aspects including an acceleration operation by the driver in particular. More specifically, when the driver excessively steps on the accelerator pedal, the instantaneous value line 15A is displayed at a low display positioned. Thus, the driver can realize that he or she is driving with a poor power consumption rate. On the other hand, the average value line 16A and the average value line 17A described above indicate values based on an actual driving operation within the predetermined travel distance, thereby enabling the driver to recognize the power consumption rate and the remaining possible travel range based on the power consumption rate.

The remaining possible travel range scale calculation unit 28 calculates a scale value of the remaining possible travel range scale 12A, based on the remaining battery capacity level 33a acquired from the remaining battery capacity level calculation unit 33 and the battery capacity deterioration 34a acquired from the battery capacity deterioration calculation unit 34 (based on the remaining amount). Specifically, the scale value can be obtained by SC×SOC×SOH, whereby SC (km) represents an appropriate initial value of the scale value, SOC (%) represents the remaining battery capacity level 33a, and SOH (%) represents the battery capacity deterioration 34a. For example, when SOC=50% and SOH=100%, the largest scale value (initial value SC=80) is calculated as 80×(50%)×(100%)=40.

With such calculation, various scale values can be obtained. The scale value thus calculated is input to the display unit 10A, to be displayed as the remaining possible travel range scale 12A illustrated in FIG. 2 and FIG. 3. The battery capacity deterioration 34a usually never changes dramatically, as long as there is no abnormality in the traction battery 31. Thus, the scale value indicated by the remaining possible travel range scale 12A usually change in proportion to the remaining battery capacity level 33a.

Thus, the remaining possible travel range scale calculation unit 28, which is technically in charge of calculating the scale value of the remaining possible travel range scale 12A, actually calculates the possible travel range corresponding to each power consumption rate, on the basis the remaining battery capacity level 33a and the battery capacity deterioration 34a (the remaining amount), and on the basis of the power consumption rate indicated by the lines including the instantaneous value line 15A, the average value line 16A, and the average value line 17A.

When the remaining battery capacity level 33a is low, the scale value of the remaining possible travel range scale 12A changes frequently. Thus, the scale value may be hidden, or the instantaneous value line 15A, the average value line 16A and the average value line 17A may entirely be hidden. For example, the scale value of the remaining possible travel range scale 12A may be hidden, or the instantaneous value line 15A, the average value line 16A, and the average value line 17A may entirely be hidden, when the SOC (%) drops to or below 40%.

The instantaneous value line 15A, the average value line 16A, and the average value line 17A are displayed on the display unit 10A, as a result of the calculation performed by the calculation unit 20A as described above. Thus, the relationship between the power consumption rate and the possible travel range can be indicated with the instantaneous value line 15A, the average value line 16A, and the average value line 17A.

Embodiment 2

Figure 4:
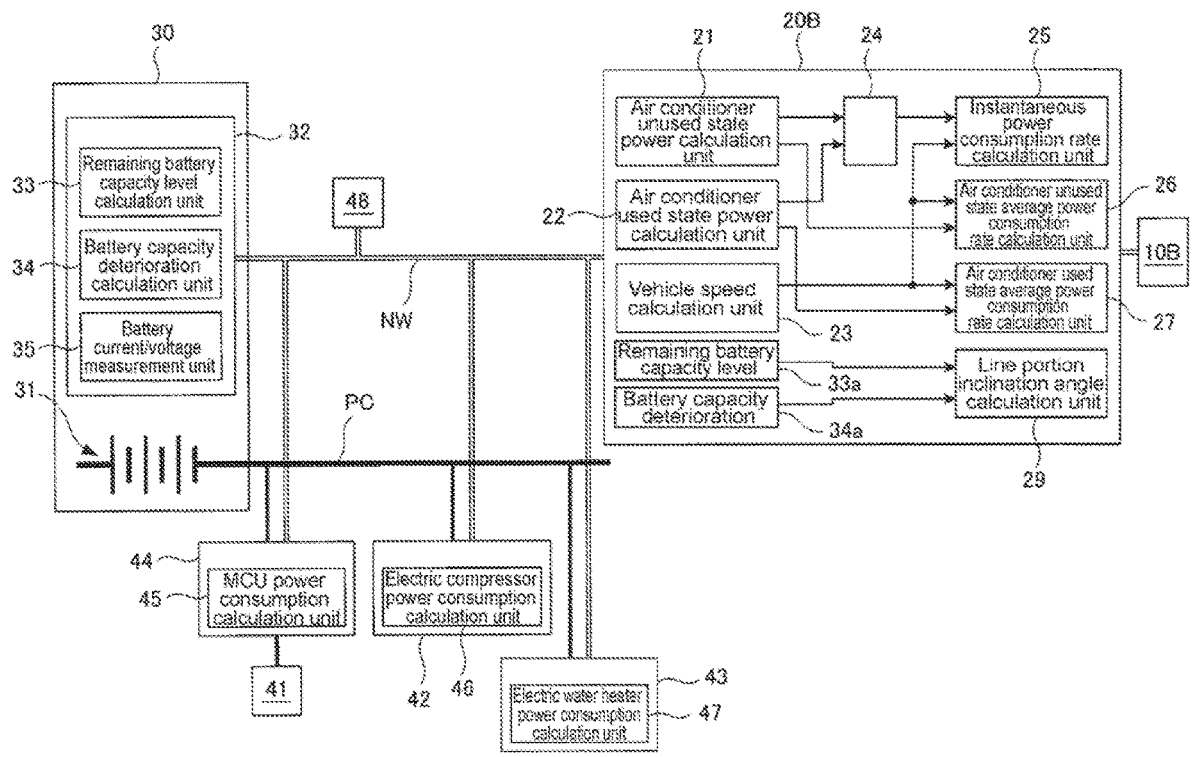
FIG. 4 a block diagram of an electric vehicle according to one example (Embodiment 2) of the present invention.
Figure 5:
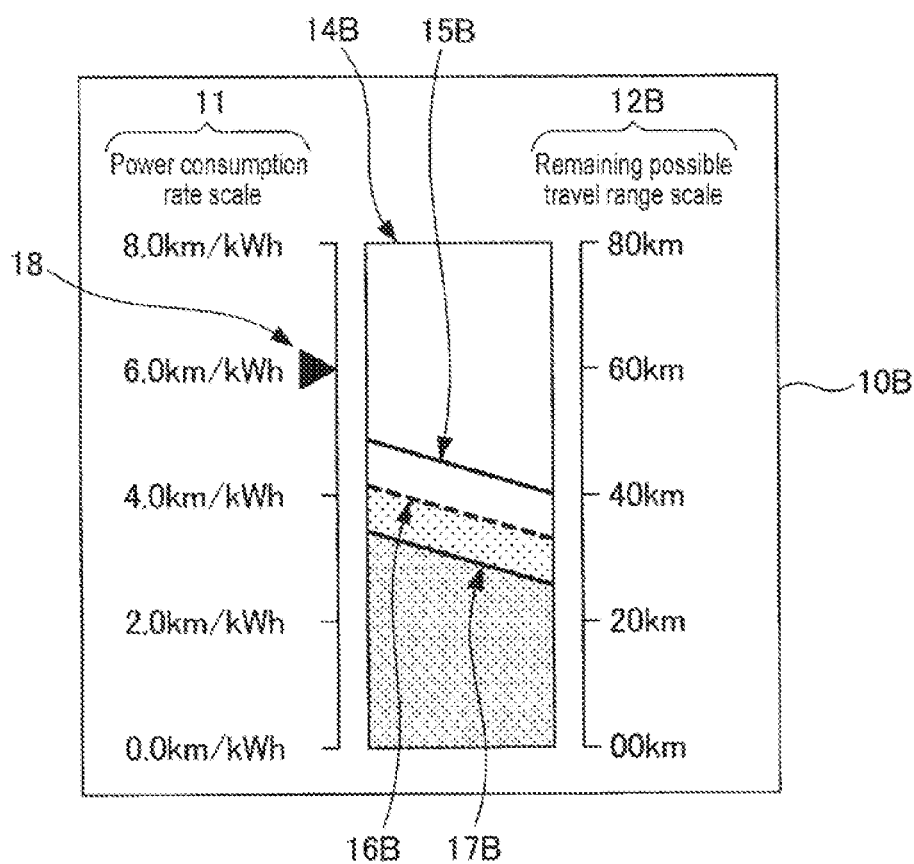
FIG. 5 is a diagram illustrating a display example in a display unit of a display device in the electric vehicle illustrated in FIG. 4, is the state where the air conditioner is used.
Figure 6:
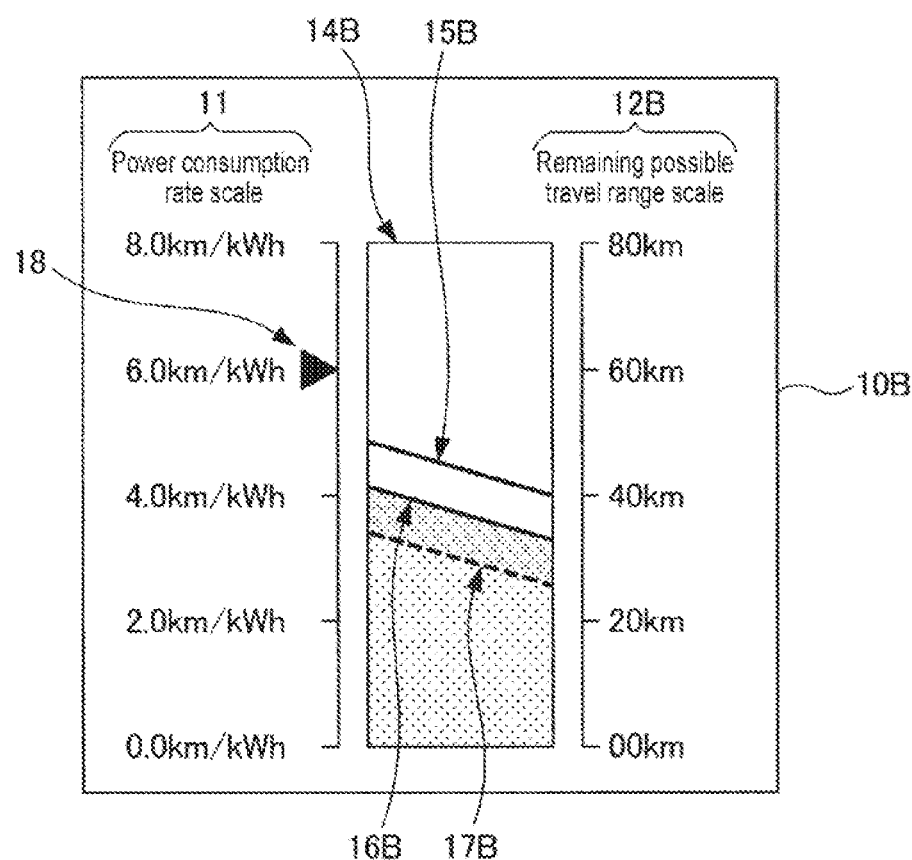
FIG. 6 is a diagram illustrating a display example in the display unit of the display device in the electric vehicle illustrated in FIG. 4, is the state where the air conditioner is unused.

FIG. 4 is a block diagram illustrating a display device for an electric vehicle according to the present embodiment. FIG. 5 and FIG. 6 each illustrate a display example of a display unit of the display device for the electric vehicle illustrated in FIG. 4. Specifically, FIG. 5 illustrates a display example in a state where the air conditioner is used (air conditioner used condition), whereas FIG. 6 illustrates a display example in a state where the air conditioner is unused (air conditioner unused condition).

The display device for the electric vehicle according to the present embodiment has a configuration substantially the same as that of the display device for the electric vehicle described in Embodiment 1 (see FIG. 1 to FIG. 3 and the like), except for part of the configuration. Thus, the different configuration is mainly described below, and redundant description is omitted.

As illustrated in FIG. 4, a vehicle including the display device for the electric vehicle according to the present embodiment includes a display unit 10B, a calculation unit 20B, and the like, and has the same configuration as that in Embodiment 1 (see FIG. 1 and the like) except for the configurations of the display unit 10B and the calculation unit 20B.

As in Embodiment 1, the display unit 10B may be provided as an independent display device on an instrument panel, or may be provided by a navigation system as a display screen. The calculation unit 20B may be implemented with an independent calculation device with a dedicated ECU additionally provided, or may be implemented with a program added to a built-in ECU.

The display on the display unit 10B as illustrated in FIG. 5 and FIG. 6, based on the calculation by the calculation unit 20B described later, includes: the power consumption rate scale 11; a remaining possible travel range scale 12B; and a display area 14B. An instantaneous value line 15B, an air conditioner unused state average value line 16B (hereinafter, "average value line 16B"), and an air conditioner used state average value line 17B (hereinafter, "average value line 17B"), as line portions, are displayed in the display area 14B. The catalog power consumption rate mark 18 is displayed in the power consumption rate scale 11. The display area 14B is a rectangle area between the power consumption rate scale 11 and the remaining possible travel range scale 12B.

The power consumption rate scale 11 and the catalog power consumption rate mark 18 in the display unit 10B are respectively the same as the power consumption rate scale 11 and the catalog power consumption rate mark 18 in the display unit 10A (see FIG. 2 and FIG. 3 and the like) described in Embodiment 1. The display unit 10B does not include the full-charge possible travel range scale 13 as in the display unit 10A described in Embodiment 1.

The remaining possible travel range scale 12B is for displaying a vertical scale for the possible travel range corresponding to the instantaneous value line 15B, the average value line 16B, and the average value line 17B, in the unit of "km". Thus, also in this embodiment, the instantaneous value line 15B, the average value line 16B, and the average value line 17B indicate the power consumption rate and the possible travel range.

Still, unlike the remaining possible travel range scale 12A in the display unit 10A described in Embodiment 1 having the variable scale value, the remaining possible travel range scale 12B in the display unit 10B according to the present embodiment has a fixed scale value. In this example, the fixed scale value is incremented in a unit of 20 km with the maximum value being 80 km. As described above, the display unit 10B according to the present embodiment includes the power consumption rate scale 11 and the remaining possible travel range scale 12B with fixed scale values. The scale values may be appropriately set differently among vehicle models, vehicles, and the like.

The scale values of the power consumption rate scale 11 and the remaining possible travel range scale 12B are set in such a manner that instantaneous value line 15B, the average value line 16B, and the average value line 17B are displayed as horizontal lines, when the traction battery 31 is fully charged and there is no battery capacity deterioration (when the traction battery 31 has the remaining amount equal to the initial battery capacity). In this configuration, the instantaneous value line 15B, the average value line 16B, and the average value line 17B are displayed as oblique lines when the remaining amount of the traction battery 31 is below the initial battery capacity as illustrated in FIG. 5 and FIG. 6. As described above, the battery capacity deterioration 34a usually never changes dramatically. Thus, the oblique lines have an inclined angle usually changing in proportion to the remaining battery capacity level 33a. Thus, the instantaneous value line 15B, the average value line 16B, and the average value line 17B usually shift in the vertical direction and have inclined angles changing in accordance with the remaining battery capacity level 33a.

Also in FIG. 5 and FIG. 6, the power consumption rate scale 11 and the remaining possible travel range scale 12B having vertical scales are associated with each other, and are arranged side by side in the horizontal direction while extending in parallel with each other, on both sides (left and right sides in the figure) of the instantaneous value line 15B, the average value line 16B, and the average value line 17B displayed as oblique lines (or horizontal lines). The power consumption rate scale 11 and the remaining possible travel range scale 12B may having horizontal scales, may be associated with each other, and may be arranged side by side in the vertical direction (upper and lower sides in the figure) while extending in parallel with each other. In such a configuration, the instantaneous value line 15B, the average value line 16B, and the average value line 17B may each be provided between the scales as oblique lines shifting in the lateral direction and having the inclined angle changed. Simply put, the display mode illustrated in FIG. 5 and FIG. 6 may be changed by being rotated by 90°. The power consumption rate scale 11 and the remaining possible travel range scale 12B may be modified to have circular or arc shaped scales. The power consumption rate scale 11 and the remaining possible travel range scale 12B having the circular or arc shaped scales may be concentrically arranged and may be associated with each other with the one of the scales provided more on the inner side than the other. In such a configuration, the instantaneous value line 15B, the average value line 16B, and the average value line 17B may be each displayed as a line (a straight line or a curved line) shifting in the circumference direction of the scales having the circular or arc shape.

The instantaneous value line 15B, as an oblique line (horizontal line), has an end portion that is closer to the power consumption rate scale 11 and indicates the instantaneous power consumption rate (first power consumption rate) calculated by the instantaneous power consumption rate calculation unit 25, and has an end portion that is closer to the remaining possible travel range scale 12B and indicates the possible travel range (first possible travel range) achievable at the instantaneous power consumption rate. The instantaneous value line 15B has a displayed position in the display area 14B shifting in the vertical direction based on the instantaneous power consumption rate calculated and having an inclined angle changing in accordance with calculation by a line portion inclination angle calculation unit 29 described later.

The average value line 16B, as an oblique line (horizontal line), has an end portion that is closer to the power consumption rate scale 11 and indicates the average power consumption rate (second power consumption rate) in the air conditioner unused state calculated by the air conditioner unused state average power consumption rate calculation unit 26, and has an end portion that is closer to the remaining possible travel range scale 12B and indicates the possible travel range (second possible travel range) achievable at the average power consumption rate in the air conditioner unused state. The average value line 16B has a displayed position in the display area 14B shifting in the vertical direction based on the average power consumption rate in the air conditioner unused state calculated and having an inclined angle changing in accordance with calculation by the line portion inclination angle calculation unit 29 described later. The average value line 16B is displayed as a part of a displayed bar graph.

The average value line 17B, as an oblique line (horizontal line), has an end portion that is closer to the power consumption rate scale 11 and indicates the average power consumption rate (third power consumption rate) in the air conditioner used state calculated by the air conditioner used state average power consumption rate calculation unit 27, and has an end portion that is closer to the remaining possible travel range scale 12B and indicates the possible travel range (third possible travel range) achievable at the average power consumption rate in the air conditioner used state. The average value line 17B has a displayed position in the display area 14B shifting in the vertical direction based on the average power consumption rate in the air conditioner used state calculated and having an inclined angle changing in accordance with calculation by the line portion inclination angle calculation unit 29 described later. The average value line 17B is displayed as a part of the displayed bar graph.

Even in the air conditioner used condition where the air conditioner is used, the average power consumption rate in the air conditioner unused state is calculated, and the air conditioner unused state average value line 16B is displayed together with the air conditioner used state average value line 17B and the instantaneous value line 15B as illustrated in FIG. 5. Even in the air conditioner unused condition where the air conditioner is unused, the average power consumption rate in the air conditioner used state is calculated (estimated value calculation), and the air conditioner used state average value line 17B is displayed together with the air conditioner unused state average value line 16B and the instantaneous value line 15B as illustrated in FIG. 6.

In the air conditioner used condition, as in Embodiment 1, the air conditioner used state average value line 17B and the air conditioner unused state average value line 16B are displayed visually differently, with the former being more noticeable than the latter. For example, the two lines are different types of lines, or have different colors or densities. An area from the origin to the air conditioner used state average value line 17B and an area from the air conditioner used state average value line 17B to the air conditioner unused state average value line 16B are displayed visually differently, with the former being more noticeable than the latter. For example, the two areas have different colors, densities, or lighting states (see FIG. 5).

Also in the air conditioner unused condition, as in Embodiment 1, the air conditioner unused state average value line 16B and the air conditioner used state average value line 17B are displayed visually differently, with the former being more noticeable than the latter. For example, the two lines are different types of lines, or have different colors or densities. The area from the air conditioner used state average value line 17B to the air conditioner unused state average value line 16B and the area from the origin to the air conditioner used state average value line 17B are displayed visually differently, with the former being more noticeable than the latter. For example, the two areas have different colors, densities, or lighting states (see FIG. 6).

For example, also in the air conditioner used condition, the air conditioner unused state average value line 16B and the air conditioner used state average value line 17B may be displayed visually differently, with the former being more noticeable than the latter. With such a display mode, the driver can more easily notice the air conditioner unused state average value line 16B, and thus can be guided towards the ecological driving.

The instantaneous value line 15B may be displayed visually differently from the average value line 16B and the average value line 17B. For example, the instantaneous value line 15B may be a different type of line, or have a different color or density compared with the average value line 16B and the average value line 17B.

In the display unit 10B illustrated in FIG. 5 and FIG. 6, the instantaneous value line 15B, the average value line 16B, and the average value line 17B, as oblique lines (or horizontal lines), each indicate the power consumption rate and the possible travel range. Thus, the driver can be provided with a display with which an association between the power consumption rate and the possible travel range can be recognized. The catalog power consumption rate indicated by the catalog power consumption rate mark 18 is displayed to the driver together with the power consumption rate and the possible travel range indicated by the instantaneous value line 15B, the average value line 16B, and the average value line 17B. Thus, the driver can be guided towards the ecological driving involving a power consumption rate close to the catalog power consumption rate, whereby the possible travel range can be prevented from decreasing.

The display on the display unit 10B illustrated in FIG. 5 and FIG. 6 is based on the calculation by the calculation unit 20B. More specifically, as in Embodiment 1, the calculation unit 20B receives information from the BMU 32, the electric compressor 42, the electric water heater 43, the MCU 44, the accessory battery, and the speed meter 48, and calculates the power consumption rate or the like based on the information. The result of the calculation is displayed on the display unit 10B.

The calculation unit 20B will now be described. The calculation unit 20B includes the air conditioner unused state power calculation unit 21, the air conditioner used state power calculation unit 22, the vehicle speed calculation unit 23, the selection unit 24, the instantaneous power consumption rate calculation unit 25, the air conditioner unused state average power consumption rate calculation unit 26, and the air conditioner used state average power consumption rate calculation unit 27, as in the case of the calculation unit 20A (refer to FIG. 1 and the like) in Embodiment 1. The calculation unit 20B according to the present embodiment includes the line portion inclination angle calculation unit 29, instead of the remaining possible travel range scale calculation unit 28 in the calculation unit 20A according to Embodiment 1.

The line portion inclination angle calculation unit 29 calculates a scale value that is similar to the scale value of the remaining possible travel range scale 12A, based on the remaining battery capacity level 33a acquired from the remaining battery capacity level calculation unit 33 and the battery capacity deterioration 34a acquired from the battery capacity deterioration calculation unit 34 (based on the remaining amount), as in the case of the remaining possible travel range scale calculation unit 28. The remaining possible travel range scale 12B according to the present embodiment has fixed scale values. Thus, the inclined angles of the instantaneous value line 15B, the average value line 16B, and the average value line 17B are each calculated based on the amount or rate of change between the calculated scale value and the fixed scale value.

The line portion inclination angle calculation unit 29, which is technically in charge of calculating the inclination angles of the instantaneous value line 15B, the average value line 16B, and the average value line 17B, actually calculates the possible travel range corresponding to the power consumption rate indicated by the instantaneous value line 15B, the average value line 16B, and the average value line 17B, based on the remaining battery capacity level 33a and the battery capacity deterioration 34a (the remaining amount).

Instead of the line portion inclination angle calculation unit 29, a calculation unit that directly calculates the possible travel range may be provided. In this case, based on the remaining battery capacity level 33a acquired from the remaining battery capacity level calculation unit 33 and the battery capacity deterioration 34a acquired from the battery capacity deterioration calculation unit 34 (based on the remaining amount), the possible travel range achievable at the instantaneous power consumption rate, the possible travel range achievable at the air conditioner unused state average power consumption rate, and the possible travel range achievable at the air conditioner used state average power consumption rate may be calculated for the instantaneous power consumption rate calculated by the instantaneous power consumption rate calculation unit 25, the air conditioner unused state average power consumption rate calculated by air conditioner unused state average power consumption rate calculation unit 26, and the air conditioner used state average power consumption rate calculated by the air conditioner used state average power consumption rate calculation unit 27.

The display unit 10B receives the inclination angle calculated by the line portion inclination angle calculation unit 29, as well as the instantaneous power consumption rate calculated by the instantaneous power consumption rate calculation unit 25, the air conditioner unused state average power consumption rate calculated by the air conditioner unused state average power consumption rate calculation unit 26, and the air conditioner used state average power consumption rate calculated by the air conditioner used state average power consumption rate calculation unit 27.

As described above with reference to FIG. 5 and FIG. 6, the instantaneous value line 15B displayed by the display unit 10B has the end portion that is closer to the power consumption rate scale 11 and indicates the instantaneous power consumption rate and the end portion that is closer to the remaining possible travel range scale 12B and indicates the possible travel range achievable at the instantaneous power consumption rate. The average value line 16B displayed has the end portion that is closer to the power consumption rate scale 11 and indicates the average power consumption rate in the air conditioner unused state and the end portion that is closer to the remaining possible travel range scale 12B and indicates the possible travel range achievable at the average power consumption rate in the air conditioner unused state. The average value line 17B displayed has the end portion that is closer to the power consumption rate scale 11 and indicates the average power consumption rate in the air conditioner used state and the end portion that is closer to the remaining possible travel range scale 12B and indicates the possible travel range achievable at the average power consumption rate in the air conditioner used state.

The calculation unit 20B performs the calculation described above, and the instantaneous value line 15B, the average value line 16B, and the average value line 17B are displayed on the display unit 10B. Thus, the relationship between the power consumption rate and the possible travel range can be indicated with the instantaneous value line 15B, the average value line 16B, and the average value line 17B.

In Embodiment 1 and Embodiment 2, the instantaneous power consumption rate, the average power consumption rate in the air conditioner unused state, and the average power consumption rate in the air conditioner used state are calculated on the basis of the power consumption of the traction battery 31. When the vehicle includes a generator for regeneration, the calculation for the instantaneous power consumption rate, the average power consumption rate in the air conditioner unused state, and the average power consumption rate in the air conditioner used state may be further based on regenerative power provided by the generator.

In Embodiment 1 and Embodiment 2, the power consumption rate (instantaneous power consumption rate, the average power consumption rate in the air conditioner unused state, and the average power consumption rate in the air conditioner used state) is defined by the power consumption rate (km/kWh) indicating the travel distance (km) achievable per unit of energy (1 kWh). Alternatively, a power consumption amount (kWh/km) indicating an energy amount (kWh) per unit travel distance (1 km) may be employed.

INDUSTRIAL APPLICABILITY

The present application is suitably applied to electric vehicles such as electric cars and hybrid vehicles.

The invention claimed is:

1. A display device for an electric vehicle, comprising:
a calculation unit which calculates a power consumption rate of the electric vehicle on the basis of a travel distance of the electric vehicle and power consumption of a traction battery of the electric vehicle relative to the travel distance, and which calculates a possible travel range for each corresponding power consumption rate based on a remaining amount of the traction battery; and
a display unit which displays the power consumption rate calculated by the calculation unit, and the calculated travel range, wherein
the display unit includes:
a power consumption rate scale indicating scales of the power consumption rate;
a possible travel range scale indicating scales of the possible travel range and disposed corresponding to the power consumption rate scale; and
a line portion displayed between the power consumption rate scale and the possible travel range scale, and
the line portion has two end portions including an end portion that is closer to the power consumption rate scale and indicates the power consumption rate, and an end portion that is closer to the possible travel range scale and indicates the possible travel range.

2. The display device for the electric vehicle according to claim 1, wherein the display unit:
displays the power consumption rate scale having vertical or horizontal scales;
displays the possible travel range scale having vertical or horizontal scales, such that the possible travel range scale is arranged vertically or horizontally side by side with the power consumption rate scale; and
displays the line portion as a horizontal line or a vertical line, with a scale value of the power consumption rate scale being a fixed value and a scale value of the possible travel range scale being a variable value based on the remaining amount.

3. The display device for the electric vehicle according to claim 1, wherein the display unit:
displays the power consumption rate scale having vertical or horizontal scales;
displays the possible travel range scale having vertical or horizontal scales, such that the possible travel range scale is arranged vertically or horizontally side by side with the power consumption rate scale; and
displays the line portion as an oblique line, with a scale value of the power consumption rate scale and a scale value of the possible travel range scale being fixed values.

4. The display device for the electric vehicle according to claim 1, wherein the display unit displays a mark indicating a target value of the power consumption rate.

5. The display device for the electric vehicle according to claim 2, wherein the display unit displays a mark indicating a target value of the power consumption rate.

6. The display device for the electric vehicle according to claim 3, wherein the display unit displays a mark indicating a target value of the power consumption rate.

7. The display device for the electric vehicle according to claim 1, wherein
the electric vehicle includes a traction motor and electrical equipment other than the traction motor which receive power supply from the traction battery,
the calculation unit calculates, as the power consumption rate: a first power consumption rate based on an instantaneous travel distance of the electrical vehicle at a current moment and based on the power consumption relative to the instantaneous travel distance; a second power consumption rate based on a predetermined travel distance longer than the instantaneous travel distance and based on power consumption of the traction motor relative to the predetermined travel distance; and a third power consumption rate based on the predetermined travel distance and based on power consumption of the traction motor and power consumption of the electrical equipment relative to the predetermined travel distance, and
the display unit displays a line portion indicating the second power consumption rate and a second possible travel range achievable at the second power consumption rate, and a line portion indicating the third power consumption rate and a third possible travel range achievable at the third power consumption rate, such that these line portions are arranged side by side with a line portion indicating the first power consumption rate and a first possible travel range achievable at the first power consumption rate.

8. The display device for the electric vehicle according to claim 2, wherein the electric vehicle includes a traction motor and electrical equipment other than the traction motor which receive power supply from the traction battery, the calculation unit calculates, as the power consumption rate: a first power consumption rate based on an instantaneous travel distance of the electrical vehicle at a current moment and based on the power consumption relative to the instantaneous travel distance; a second power consumption rate based on a predetermined travel distance longer than the instantaneous travel distance and based on power consumption of the traction motor relative to the predetermined travel distance; and a third power consumption rate based on the predetermined travel distance and based on power consumption of the traction motor and power consumption of the electrical equipment relative to the predetermined travel distance, and the display unit displays a line portion indicating the second power consumption rate and a second possible travel range achievable at the second power consumption rate, and a line portion indicating the third power consumption rate and a third possible travel range achievable at the third power consumption rate, such that these line portions are arranged side by side with a line portion indicating the first power consumption rate and a first possible travel range achievable at the first power consumption rate.

9. The display device for the electric vehicle according to claim 3, wherein the electric vehicle includes a traction motor and electrical equipment other than the traction motor which receive power supply from the traction battery, the calculation unit calculates, as the power consumption rate: a first power consumption rate based on an instantaneous travel distance of the electrical vehicle at a current moment and based on the power consumption relative to the instantaneous travel distance; a second power consumption rate based on a predetermined travel distance longer than the instantaneous travel distance and based on power consumption of the traction motor relative to the predetermined travel distance; and a third power consumption rate based on the predetermined travel distance and based on power consumption of the traction motor and power consumption of the electrical equipment relative to the predetermined travel distance, and the display unit displays a line portion indicating the second power consumption rate and a second possible travel range achievable at the second power consumption rate, and a line portion indicating the third power consumption rate and a third possible travel range achievable at the third power consumption rate, such that these line portions are arranged side by side with a line portion indicating the first power consumption rate and a first possible travel range achievable at the first power consumption rate.

10. The display device for the electric vehicle according to claim 4, wherein the electric vehicle includes a traction motor and electrical equipment other than the traction motor which receive power supply from the traction battery, the calculation unit calculates, as the power consumption rate: a first power consumption rate based on an instantaneous travel distance of the electrical vehicle at a current moment and based on the power consumption relative to the instantaneous travel distance; a second power consumption rate based on a predetermined travel distance longer than the instantaneous travel distance and based on power consumption of the traction motor relative to the predetermined travel distance; and a third power consumption rate based on the predetermined travel distance and based on power consumption of the traction motor and power consumption of the electrical equipment relative to the predetermined travel distance, and the display unit displays a line portion indicating the second power consumption rate and a second possible travel range achievable at the second power consumption rate, and a line portion indicating the third power consumption rate and a third possible travel range achievable at the third power consumption rate, such that these line portions are arranged side by side with a line portion indicating the first power consumption rate and a first possible travel range achievable at the first power consumption rate.

11. The display device for the electrical vehicle according to claim 1, wherein the electric vehicle includes a traction motor and an air conditioner which receive power supply from the traction battery, the calculation unit calculates, as the power consumption rate: a first power consumption rate based on an instantaneous travel distance of the electrical vehicle at a current moment and based on the power consumption relative to the instantaneous travel distance; a second power consumption rate that is an average power consumption rate of a plurality of power consumption rates obtained when the air conditioner is unused; and a third power consumption rate that is an average power consumption rate of a plurality of power consumption rates obtained when the air conditioner is used, and the display unit displays a line portion indicating the second power consumption rate and a second possible travel range achievable at the second power consumption rate, and a line portion indicating the third power consumption rate and a third possible travel range achievable at the third power consumption rate, such that these line portions are arranged side by side with a line portion indicating the first power consumption rate and a first possible travel range achievable at the first power consumption rate.

12. The display device for the electrical vehicle according to claim 2, wherein the electric vehicle includes a traction motor and an air conditioner which receive power supply from the traction battery, the calculation unit calculates, as the power consumption rate: a first power consumption rate based on an instantaneous travel distance of the electrical vehicle at a current moment and based on the power consumption relative to the instantaneous travel distance; a second power consumption rate that is an average power consumption rate of a plurality of power consumption rates obtained when the air conditioner is unused; and a third power consumption rate that is an average power consumption rate of a plurality of power consumption rates obtained when the air conditioner is used, and the display unit displays a line portion indicating the second power consumption rate and a second possible travel range achievable at the second power consumption rate, and a line portion indicating the third power consumption rate and a third possible travel range achievable at the third power consumption rate, such that these line portions are arranged side by side with a line portion indicating the first power consumption rate and a first possible travel range achievable at the first power consumption rate.

13. The display device for the electrical vehicle according to claim 3, wherein
the electric vehicle includes a traction motor and an air conditioner which receive power supply from the traction battery,
the calculation unit calculates, as the power consumption rate: a first power consumption rate based on an instantaneous travel distance of the electrical vehicle at a current moment and based on the power consumption relative to the instantaneous travel distance; a second power consumption rate that is an average power consumption rate of a plurality of power consumption rates obtained when the air conditioner is unused; and a third power consumption rate that is an average power consumption rate of a plurality of power consumption rates obtained when the air conditioner is used, and
the display unit displays a line portion indicating the second power consumption rate and a second possible travel range achievable at the second power consumption rate, and a line portion indicating the third power consumption rate and a third possible travel range achievable at the third power consumption rate, such that these line portions are arranged side by side with a line portion indicating the first power consumption rate and a first possible travel range achievable at the first power consumption rate.

14. The display device for the electrical vehicle according to claim 4, wherein
the electric vehicle includes a traction motor and an air conditioner which receive power supply from the traction battery,
the calculation unit calculates, as the power consumption rate: a first power consumption rate based on an instantaneous travel distance of the electrical vehicle at a current moment and based on the power consumption relative to the instantaneous travel distance; a second power consumption rate that is an average power consumption rate of a plurality of power consumption rates obtained when the air conditioner is unused; and a third power consumption rate that is an average power consumption rate of a plurality of power consumption rates obtained when the air conditioner is used, and
the display unit displays a line portion indicating the second power consumption rate and a second possible travel range achievable at the second power consumption rate, and a line portion indicating the third power consumption rate and a third possible travel range achievable at the third power consumption rate, such that these line portions are arranged side by side with a line portion indicating the first power consumption rate and a first possible travel range achievable at the first power consumption rate.

15. The display device for the electric vehicle according to claim 11, wherein the display unit displays the line portion indicating the second power consumption rate and the second possible travel range, and the line portion indicating the third power consumption rate and the third possible travel range, both when the air conditioner is used and when the air conditioner is unused.

16. The display device for the electric vehicle according to claim 12, wherein the display unit displays the line portion indicating the second power consumption rate and the second possible travel range, and the line portion indicating the third power consumption rate and the third possible travel range, both when the air conditioner is used and when the air conditioner is unused.

17. The display device for the electric vehicle according to claim 7, wherein the display unit displays the line portion indicating the second power consumption rate and the second possible travel range, and the line portion indicating the third power consumption rate and the third possible travel range, such that the line portions are visually different from each other.

18. The display device for the electric vehicle according to claim 11, wherein the display unit displays the line portion indicating the second power consumption rate and the second possible travel range, and the line portion indicating the third power consumption rate and the third possible travel range, such that the line portions are visually different from each other.

19. The display device for the electric vehicle according to claim 7, wherein the display unit displays an area from an origin to the line portion indicating the third power consumption rate and the third possible travel range, and an area from the line portion indicating the third power consumption rate and the third possible travel range to the line portion indicating the second power consumption rate and the second possible travel range, such that the areas are visually different from each other.

20. The display device for the electric vehicle according to claim 11, wherein the display unit displays an area from an origin to the line portion indicating the third power consumption rate and the third possible travel range, and an area from the line portion indicating the third power consumption rate and the third possible travel range to the line portion indicating the second power consumption rate and the second possible travel range, such that the areas are visually different from each other.

* * * * *